United States Patent [19]
Jaaskelainen, Jr.

[11] Patent Number: 6,002,397
[45] Date of Patent: Dec. 14, 1999

[54] WINDOW HATCHES IN GRAPHICAL USER INTERFACE

[75] Inventor: William Jaaskelainen, Jr., Austin, Tex.

[73] Assignee: International Business Machines Corporation, Armonk, N.Y.

[21] Appl. No.: 08/940,455

[22] Filed: Sep. 30, 1997

[51] Int. Cl.$^6$ ..................................................... G06F 3/14
[52] U.S. Cl. ........................ 345/340; 345/342; 345/339; 345/345; 345/346
[58] Field of Search .................................. 345/340, 342, 345/344, 339, 345, 334, 346, 357

[56] References Cited

U.S. PATENT DOCUMENTS

| | | | |
|---|---|---|---|
| 4,533,910 | 8/1985 | Sukonick et al. | 345/346 |
| 4,550,315 | 10/1985 | Bass | 345/199 |
| 4,823,303 | 4/1989 | Terasawa | 345/340 |
| 4,868,765 | 9/1989 | Diefendroff | 345/345 |
| 5,265,202 | 11/1993 | Krueger et al. | 345/345 |
| 5,283,560 | 2/1994 | Bartlett | 345/113 |
| 5,351,067 | 9/1994 | Lumelsky et al. | 345/191 |
| 5,425,141 | 6/1995 | Gedye | 345/332 |
| 5,463,728 | 10/1995 | Blahut et al. | 345/344 |
| 5,475,812 | 12/1995 | Corona et al. | 345/340 |
| 5,491,795 | 2/1996 | Beaudet et al. | 345/345 |
| 5,638,501 | 6/1997 | Gouch et al. | 345/435 |
| 5,651,107 | 7/1997 | Frank et al. | 345/344 |

OTHER PUBLICATIONS

IBM Technical Disclosure Bulletin, vol. 36, No. 06A, Jun. 1993, Transulucent Window Attribute, p. 135.

*Primary Examiner*—Raymond J. Bayerl
*Assistant Examiner*—Thomas T. Nguyen
*Attorney, Agent, or Firm*—Jeffrey S. LaBaw

[57] ABSTRACT

A window hatch is created in a displayed window. Once the hatch is created, a portion of the displayed window delimited by the hatch disappears, revealing the window underneath. Multiple invocations of the hatch operation bore through lower, underlying windows until the desired window is reached. Thus, portions of the desired underlying window show through the window hatch, while the top window remains in view. The window hatch can be adjusted in size and shape. The underlying window can be repositioned so that the desired information shows through the hatch. Various navigation and information cues are available to assist the user in understanding the relationship of the various windows and correctly positioning the window hatch.

27 Claims, 9 Drawing Sheets

WINDOW HATCHES IN GRAPHICAL USER INTERFACE

BACKGROUND OF THE INVENTION

This invention relates generally to graphical user interfaces for computer systems. More particularly, it relates to an improved user interface which allows user defined window hatches to reveal portions of underlying windows in an overlying window in a windowing user interface.

It is typical in many graphical user interfaces to use windows for displaying the interface of various applications and tasks which are running in a current computer system session. The window is generally a rectangular region in which text or graphical information is presented to the user regarding output from or input to the particular owning task or application. As the "real estate" on the computer display is limited, most modern graphical user interfaces also allow the windows to overlap each other so that most of the display space is devoted to the window owned by the application or task to which the user is currently devoting his attention. This in focus or primary window appears to be on top of the interface. An unfortunate side effect is that at least a portion of, if not all, an underlying window is obscured by the top window. Although obscured, the computer will continue to write to underlying windows with output from the respective owning application. At times, however, the degree to which information can be buried by the plethora of windows can be very frustrating to the user.

It is possible to close, reposition or minimize the overlying windows to reveal needed information which is obscured. However, if the user needs information in both windows, this involves a great deal of manipulation by the user of window controls, traversing between windows repetitively. In such a case, it is inconvenient to close or minimize the windows to repetitively change the focus of the interface bring one or the other window to the top of the user interface. Further, repositioning may be problematic where the needed information is present both in the top window and a lower window. Due to the way that the respective windows are formatted, it can be impossible for the needed information to coexist on the screen at the same time.

There are situations where it would be convenient to be able to observe parts of lower windows which are covered by the top window without rearranging the desktop by moving or minimizing windows or changing the user focus in the user interface. For example, the user may wish to periodically check the progress of a process running in the background without disturbing the window to which his primary attention is directed. There are numerous data entry operations where it would be convenient to refer to underlying windows.

The prior art has recognized the problem addressed by the present invention. One solution proposed by many has been to make the overlying window completely or partially transparent. In some solutions, the transparency is activated if a top window overlies an object which has been designated to be shown through an overlying window. Other solutions suggest blending all the windows in the interface so that all of the objects in the interface in any window may be perceived. However, in these interfaces, the display gets very confusing as to which objects belong to a particular window, particularly in overlapping regions. When very many windows are displayed in an interface, this approach is unworkable. Further, most of these solutions are "all or nothing", either all of the windows are made transparent or all of an underlying object is exposed. Many times these actions occur without user direction. In other words, the user is not allowed to tailor the interface to his current needs.

Another solution proposed has been to define a "port hole" window in a portion of a window which may be covered by subsequent actions in the interface. The designated portion is always presented on top of the interface. Thus, there seems to be a port hole in the overlying window.

The port hole solution allows the user to tailor his interface. However, there are several problems with this approach; some of these problems also occur in the transparent window approaches described above. First, it requires that the user anticipate what information will need to be kept on top of the interface. A user may not realize until later that the information is desired; the user would be required to backtrack to designate the information to be surfaced. Second, the prior art methods do not give the user a good idea of the window structure of the interface. Third, it does not allow the user to place where the underlying information comes through the top window so that it is in a convenient place in the top window, i.e. does not hide or confuse important information.

This invention represents an improved solution to this problem.

SUMMARY OF THE INVENTION

Therefore, it is an object of the invention to allow user to see portions of underlying windows through window hatches in overlying windows.

It is another object of the invention to allow a user to define a window hatch without rearranging the existing windows.

It is another object of the invention to reveal the window structure of the graphical user interface.

It is another object of the invention to create a window hatch of a specified depth through a specified number of windows.

It is another object of the invention to reposition an underlying window through the window hatch.

These and other objects are accomplished by defining a window hatch in a displayed window. In one preferred embodiment, the window hatch area is to be defined by two pointer positions at opposite corners of a rectangle. Once the hatch is created, the defined rectangle would no longer be presented in the top window, revealing the window underneath. Multiple invocations of the hatch operation bore through lower, underlying windows until the desired window is reached. Thus, portions of the desired underlying window show through the window hatch, without rearranging the display priority of the overlapping windows.

Once created, the window hatch can be adjusted in several ways. The hatch borders can be grabbed and dragged similar to the manipulations of a conventional window resize. If multiple windows have been bored through, a simultaneous resize of the collocated hatches through all of the windows is preferred. The underlying window can be repositioned either with conventional window controls or by grabbing an underlying window through the window hatch so that the desired information shows through the hatch. Also, a zoom feature can be used on the underlying window to help the data fit within the window hatch.

In some embodiments of the invention, various navigation and information cues are available to assist the user in understanding the relationship of the various windows and correctly positioning the window hatches.

BRIEF DESCRIPTION OF THE DRAWINGS

These objects, features and advantages will be more readily understood with reference to the attached figures and following description.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000 (TM) line of computers which run on the AIX (TM) operating system.

Figure 1:
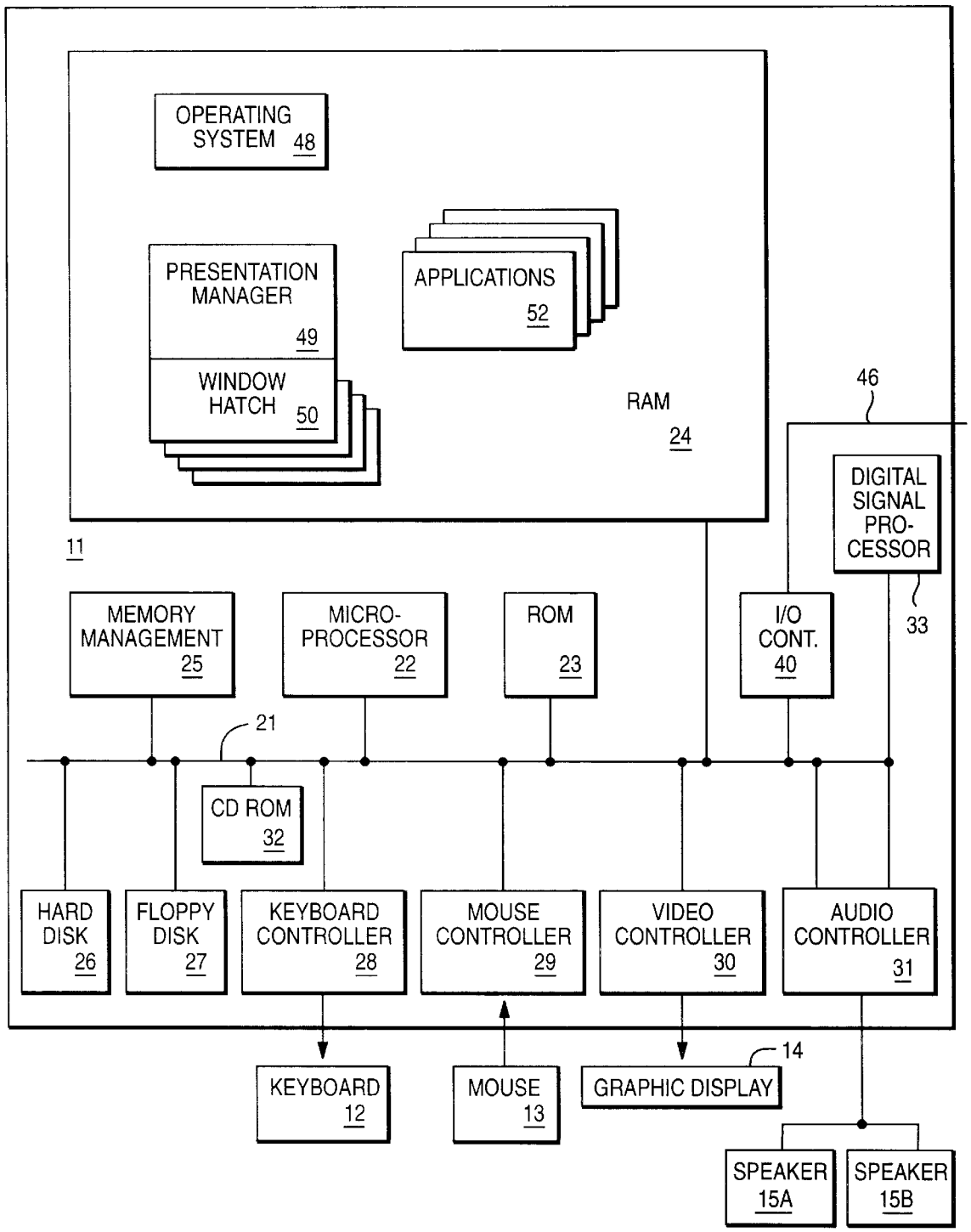
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 23 contains among other code the Basic Input-Output system (BIOS) which controls basic hardware operations such as the interaction of the processor and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 48–52 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted in a computer readable medium over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms of selecting or defining or other terms which could be associated with a human operator. No action by a human operator is desirable in any of the operations described herein which form part of the present invention; the operations are machine operations processing electrical signals to generate other electrical signals.

In the typical workstation arrangement, the mouse and/or other pointing devices and keyboard are used to interact with the interface on the display to control data entry and information retrieval. Most of these activities are presented in a layered set of windows which are presented as though one window lay on top of another. Windows presented at the top of the interface may obscure all or part of windows at the bottom of the interface. One of the windows is said to be "in focus" or to have the "focus" of the interface. This window is usually presented on the top of the interface and is the window in which user input from the mouse and keyboard is entered.

The invention addresses a deficiency of windows based user interfaces. Because of the limited screen space, the user is asked to accept the fact that one window will almost always obscure another window. Indeed, the predominant rationale for raising the focus of a window is to overcome this behavior of present day interfaces. When many windows are present in the interface, the lowest priority windows are almost totally obscured.

Figure 2A:
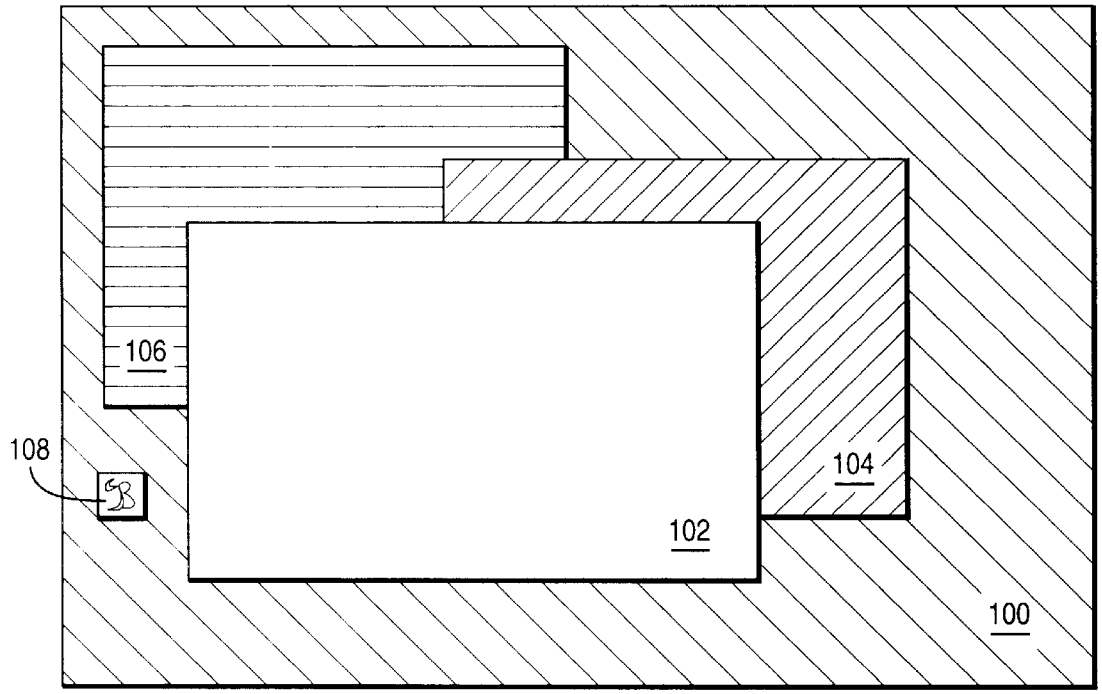
FIGS. 2A–2E depict the creation of window hatches in a windowing user interface.

As in shown in FIG. 2A, four windows 102–108 are displayed in the desktop 100 of a windowing interface. Those skilled in the art will appreciate that many more windows can be present in an interface, however, for simplicity of illustration only four are depicted. Each window is typically assigned to its own task or application. For example, top window 102 may be assigned to an internet browser. Window 104, second in priority, may be assigned to a word processor. Window 106, last in priority, other than the desktop 100 itself, may be assigned to a spreadsheet program. Windows may be minimized such as the icon 108, possibly assigned to a game program. Alternatively, the windows may be assigned to separate tasks in the same software application. As can be seen in the figure, browser window 102 obscures much of the other windows 104 and 106 as well as the desktop 100 itself. If a user was interested in seeing obscured information on those windows, in the prior art, he would be forced to rearrange the windows, e.g., raise the priority of an obscured window. The present invention presents a window hatch as improved solution to the problem.

When the user defines a window hatch within a window, the pixel location information is derived from the relative location of the hatch within the window. Thus, in the preferred embodiment, the hatch becomes part of the high level window in which it is defined. This is in contrast to the port hole method in the prior art where the port hole is defined in a lower level window. Repositioning the window will automatically reposition all of its associated hatches.

Figure 2B:
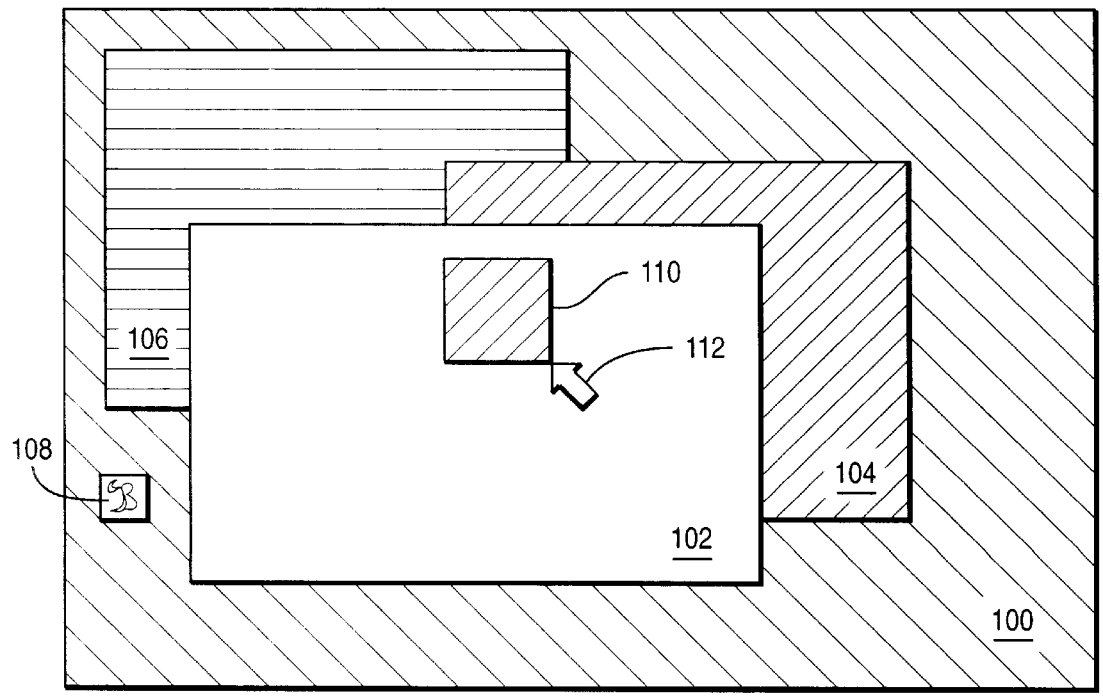

As shown in FIG. 2B, the user has created a window hatch 110 in window 102 revealing underlying window 104. In the preferred embodiment, a user enters a window hatch creation mode and defines an area by clicking the mouse cursor 112 at two opposite corners of the rectangle which will bound the window hatch. There are many selection routines known in windowing interfaces, e.g., cut and paste, which use a similar procedure. Once the area is defined, by the second mouse click, as a window hatch, the area would disappear and show the window underneath. Although not meant to be limiting, the window hatch mode could be entered, for example, by clicking on a window hatch icon on a tool bar or selection of a window hatch menu item in a pull-down menu. Other means of entering the window hatch mode such as a predefined sequence of button clicks are envisioned in alternative embodiments of the invention.

While the dual mouse click is viewed as the preferred embodiment of defining a window hatch in an upper level window, there are alternative methods. The window 102 could come equipped with a set of predefined window hatches which could be activated by proper positioning of the mouse pointer. Typically, these hatches would have little repositioning ability and in all probability would be part of an interface of windows which is only used for a small set of predefined tasks. Templates of various shaped window hatches could be available for selection on a tool bar. The selected shape could be dragged or otherwise positioned and sized in the top window. The common element in these methods is that user is defining the position and size of the hatch in the top or upper level window.

Figure 2C:
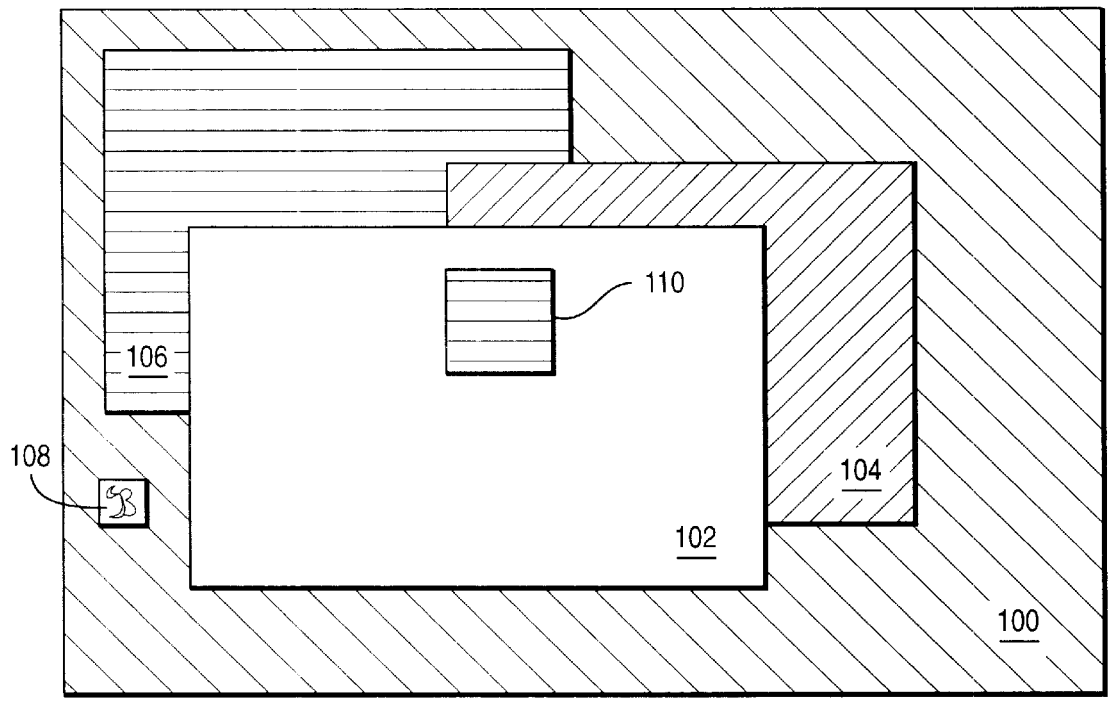

As shown in FIG. 2C, the process can continue. Once an underlying window is displayed, the user could create another hatch through that window to reveal the window below. The windows are frozen in priority during window hatch creation mode. Otherwise, once the lower level window receives focus as a hatch was defined therein, it would be raised to the top of the interface. As shown in FIG. 2C, a second hatch obscured by window hatch 110 then created in window 104. Thus, the user can look through the two window hatches through windows 102 and 104 to see a portion of window 106 below. While not depicted in the drawing, the border of the window hatch 110 can be altered to show that more than one window hatch is present. For example, a double or thickened border might be used for this purpose.

The creation of the second window hatch could be invoked by positioning of the mouse pointer at the opposing corners of the newly created window hatch. Alternatively, at the time the first window hatch is created, a dialog box could be presented to prompt the user asking how many window hatches should be created at the designated position. The available choices, 1, 2 or 3 window hatches for window hatch 110, give the user a notion of the window structure at the particular position. In this manner, window hatches through several windows could be created simultaneously.

Figure 2D:
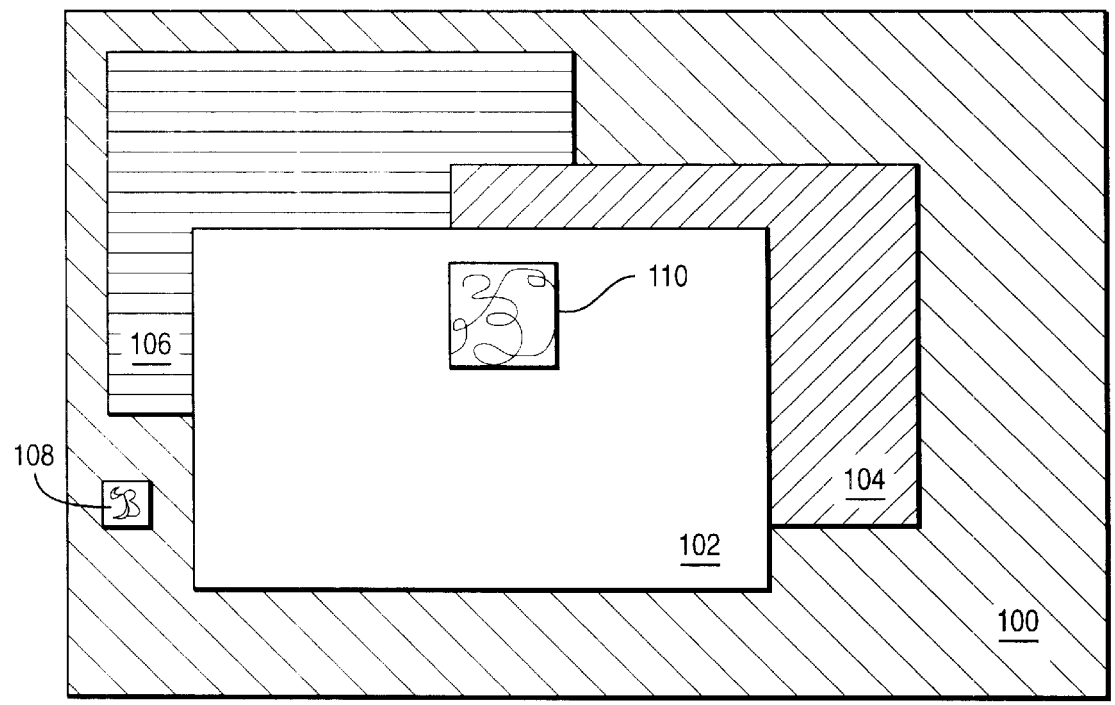

FIG. 2D the creation of a third window hatch, beneath window hatch 110, so that the desktop 100 can be viewed through the collocated window hatches. One situation where the user might wish to examine the desktop is where the icon for a new application is obscured. The user can simply drill down through all of the windows to reveal the underlining icon. Once the icon is revealed and the application is started, the window hatches can be closed.

Figure 2E:
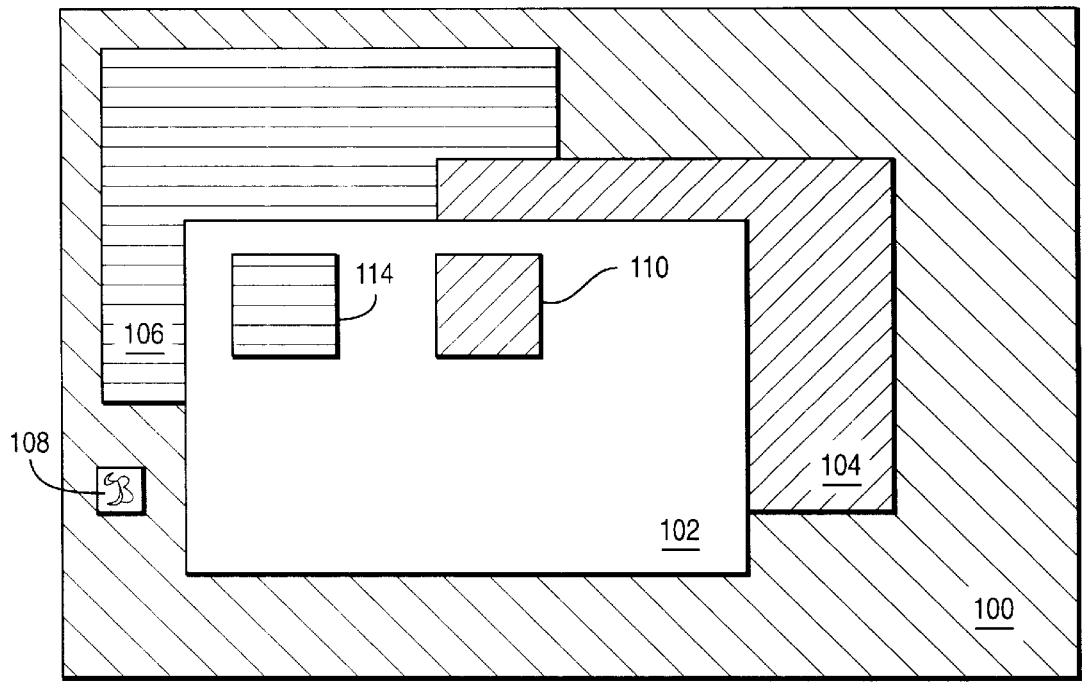

FIG. 2E is shown to illustrate the fact that multiple window hatches 110 and 114 may be created in a single window 102. The window hatches will reveal whatever window underlies the window in which they are created. In this case, window hatch 110 reveals a portion of window 104 while window hatch 114 reveals a portion of window 106. Further, window hatches can be created in any visible portion of a window, other than the desktop window. In other words, window hatches could be defined in both windows 102 and 104. The window hatches can be created in a variety of shapes and sizes. They need not be rectangular in shape. Free form window hatches can be useful to maximize the portion of the underlying window revealed.

While there are many ways in which the displays described above could be implemented, it would be preferable if these are implemented with a minimum of change to the display processes practiced by present day operating systems. However, the following description of the screen monitor module should not be taken as limiting the invention to this particular embodiment. As described in the prior art, there are many hardware, firmware and software implementations for displaying a set of windows on a display.

In many operating systems, user actions from both the pointing device or keyboard which result in a change to the interface are handled by a screen monitor module. Keyboard and mouse events are sometimes redundant in that many functions can be invoked by input from either device, and are also sometimes combined functions. For this reason, all events which impact the presentation on the display are integrated by the screen monitor module. The final screen image for any refresh is passed by the screen monitor module to the video device driver which presents the final digital image on the display. The functions of the screen monitor module are more completely described below.

The screen monitor module has many internal subroutines to accomplish its overall function. As part of integrating keyboard and mouse input, it must serve as the window manager for the system. It must handle window creation, window movement, window minimization to icon form, window resizing, and change of window focus as well as many other functions.

To manage windows efficiently, the screen monitor module maintains a table of all windows—both active and those in icon form. This window table contains information about the contents of each window, including the X-Y limits of the pixels for the window and the content and priority of each pixel. The table typically contains one default entry which describes the background or "desktop" for the display. This entry has the lowest priority pixels—that is, it is always subject to overlay by the creation of new windows. The priority of the pixels for other windows is determined by user actions. When the user indicates interest in a particular window by mouse or keyboard events, for example, by double-clicking on a window, the priority of the pixels for the window are changed to the highest priority. The entire screen is refreshed, and the order of overlay of the windows is reflected by the new screen display. The window of current interest to the user now has the "focus" and receives user input. The remaining windows are in many operating systems displayed in order of last access. The window accessed just before the current window is atop all other windows, but the window in focus. The earliest accessed window, still active and not reduced to an icon during the current session, is at the button of the stack of windows.

In the window table, the priority may be entered either as an attribute of each window or as an attribute of each pixel, depending on the operating system. If entered as a pixel attribute, the data may be in an explicit array entry of pixel value/pixel priority for each pixel, or used by a variable length array comprised of multiple entries to conserve memory or disk storage. The windows are displayed according to their priority in the window table.

Although the actual table is far more complex, for this example, the screen is depicted as a 100×100 matrix. Note also that the priority is stated as both an attribute of each window and as an attribute of each pixel to depict alternative embodiments. Also, each pixel is represented by an explicit array entry of (pixel value/pixel priority), but many embodiments will conserve memory or disk storage by using a variable length array comprised of multiple entries of count followed by the (pixel value/pixel priority).

priority 2, which is currently in icon form 108 near the left bottom of the screen. Note also that each window obscures at least part of another window except for the topmost window 102 which is in focus.

In the preferred embodiment, the pixel priority for the hatch pixels is set to zero, so a hatch pixel is not selected to overlay an existing pixel of another window in the screen display array. In the logic flow depicted in FIG. 3, described below, no modification of the logic typical in many operating systems is required because the priority for the hatch pixels never pass the logic test of being greater than the pixel already occupying an entry in the screen display array. For example, the window table, Table 2, for FIG. 2B is listed below. Table 2 depicts the addition of the hatch entry in the browser which allows the word processor pixels to be displayed.

TABLE 2

| STATE | PRIORITY | TYPE | x–y RANGE | PIXEL | PRIORIT | Hatch x–y | (REF) |
|---|---|---|---|---|---|---|---|
| Displayed | 1 | Desktop | 1/1:100/100 | X'FE',X'FE',X' . . . | 1;1;1 | | 100 |
| Iconified | 2 | game | 4/4:20/20 | X'1F',X'1F',X . . . | 2;2;2 | | 108 |
| Displayed | 5 | word processor | 15/30:75/80 | X'14',X'72',X' . . . | 5;5;5 | 30/40:40/50 priority 0; | 104/110 |
| Displayed | 3 | spread sheet | 40/3:97:40 | X'56',X'55',X' . . . | 3;3;3 | | 106 |
| Displayed | 6 | browser | 3/10:55/65 | X'00',X'00',X' . . . | 6;6;6 | | 102 |

Those skilled in the art would appreciate that other windows tables are possible depending on the windows, window hatches and operating systems involved.

Figure 3:
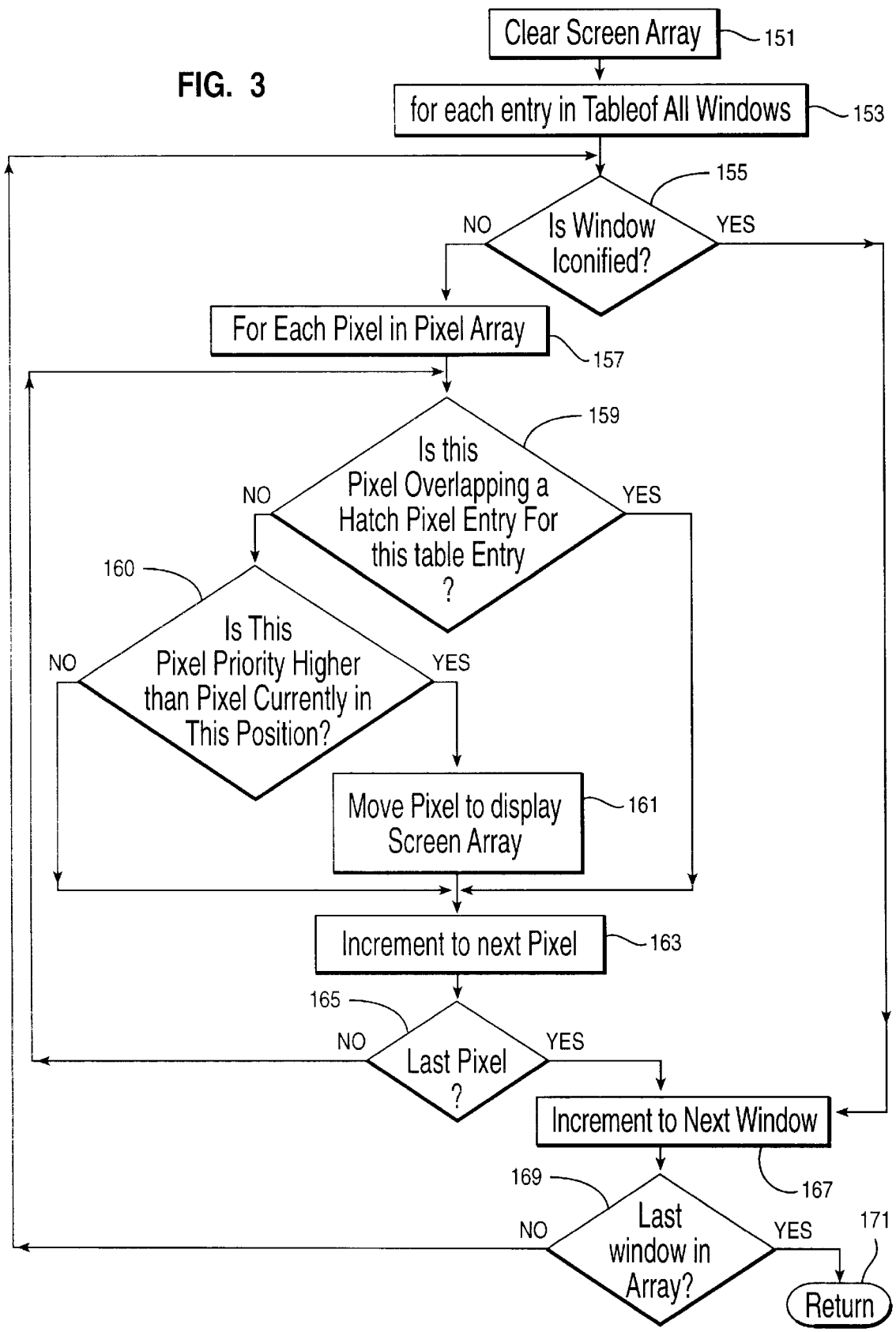
FIG. 3 is a flow diagram of the screen monitor process.

The logic used by the screen monitor module is depicted in FIG. 3. In step 151, the screen array is cleared by initializing all pixels to nulls in a work area in which the entire screen image is built. Each entry in the window table 153 is tested in step 155 to determine that window is an icon form. If not, in step 157 each pixel in the pixel array is tested in step 159 to determine whether the pixel priority is higher than the pixel currently in this position of the screen array. If so, that pixel is moved to the display position in the screen array in step 161. Step 163 increments to the next pixel in the window, the test in step 165 determines whether the present pixel is the last pixel in the window. If not, the process returns to step 159. If it is the last pixel, step 167 increments to the next window in the window table. The test in step 169 determines whether it is the last window in the window table. If the last window has been processed, the step returns in step 171.

TABLE 1

| STATE | PRIORITY | TYPE | x–y RANGE | PIXEL | PRIORIT | Hatch x–y | (REF) |
|---|---|---|---|---|---|---|---|
| Displayed | 1 | Desktop | 1/1:100/100 | X'FE',X'FE',X' . . . | 1;1;1 | | 100 |
| Iconified | 2 | game | 4/4:20/20 | X'1F',X'1F',X' . . . | 2;2;2 | | 108 |
| Displayed | 5 | word processor | 15/30:75/80 | X'14',x72',X' . . . | 5;5;5 | | 104 |
| Displayed | 3 | spread sheet | 40/3:97:40 | X'56',X'55',X' . . . | 3;3;3 | | 106 |
| Displayed | 6 | browser | 3/10:55/65 | X'00',X'00',X' . . . | 6;6;6 | | 102 |

Note that the table entries in Table 1 correspond to the screen display shown in FIG. 2A. As the highest priority, priority 6, the browser window 102 is atop all other windows. The order of display for the other windows is also determined by their priority, except for the game having The screen monitor module decides the order of window overlay by the priority of the pixels for each screen location. So that the screen monitor module can use the same logic for window hatches, it is the window table which is modified by the present invention. Table 2 above provides one representation of the window table data for the display portrayed in FIG. 2B, wherein window hatch 110 is defined in window 102.

Table 3 depicts the addition of another hatch entry, this time in the work processor which allows the spread sheet pixels to be displayed up through the work processor. Since the hatch is collocated with the hatch in the browser, the spread sheet pixels are displayed at the top level.

creating a hatch representation in the window table, the logic flow depicted in FIG. 3 still requires no changes.

Figure 4B:
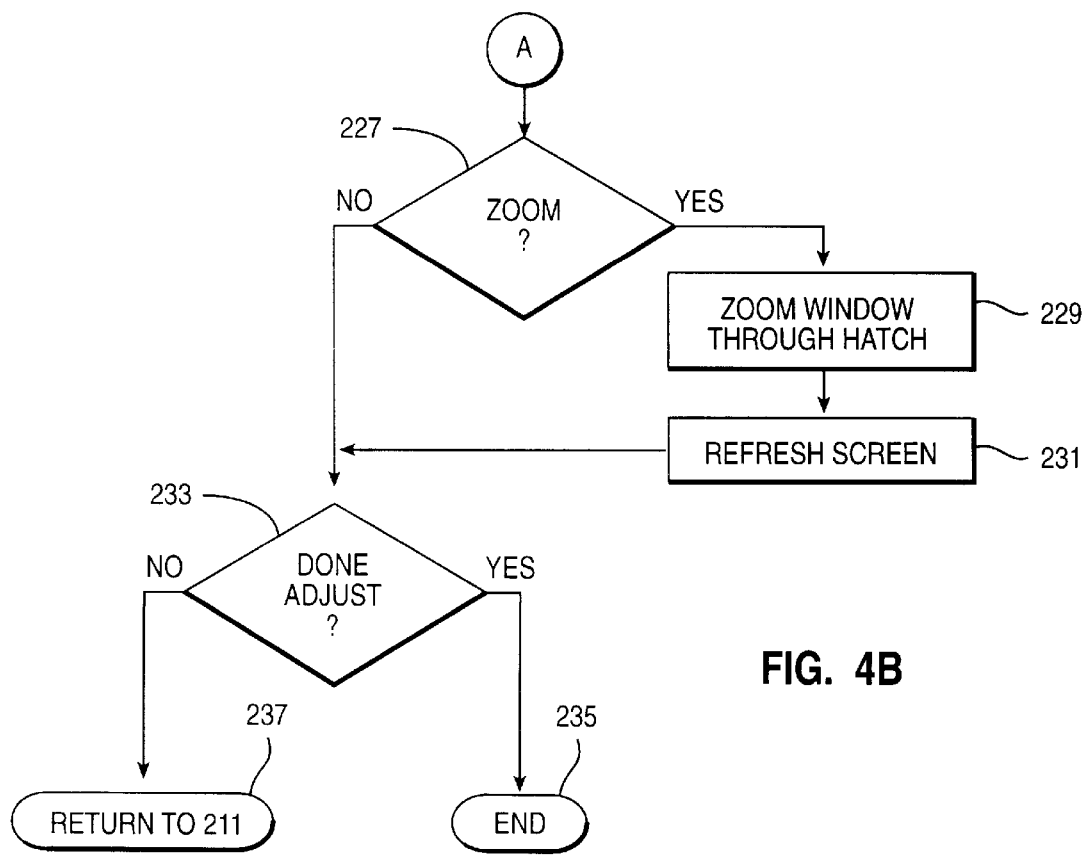
FIGS. 4A and 4B are flow diagrams of a creation of a window hatch in a window.
Figure 4A:
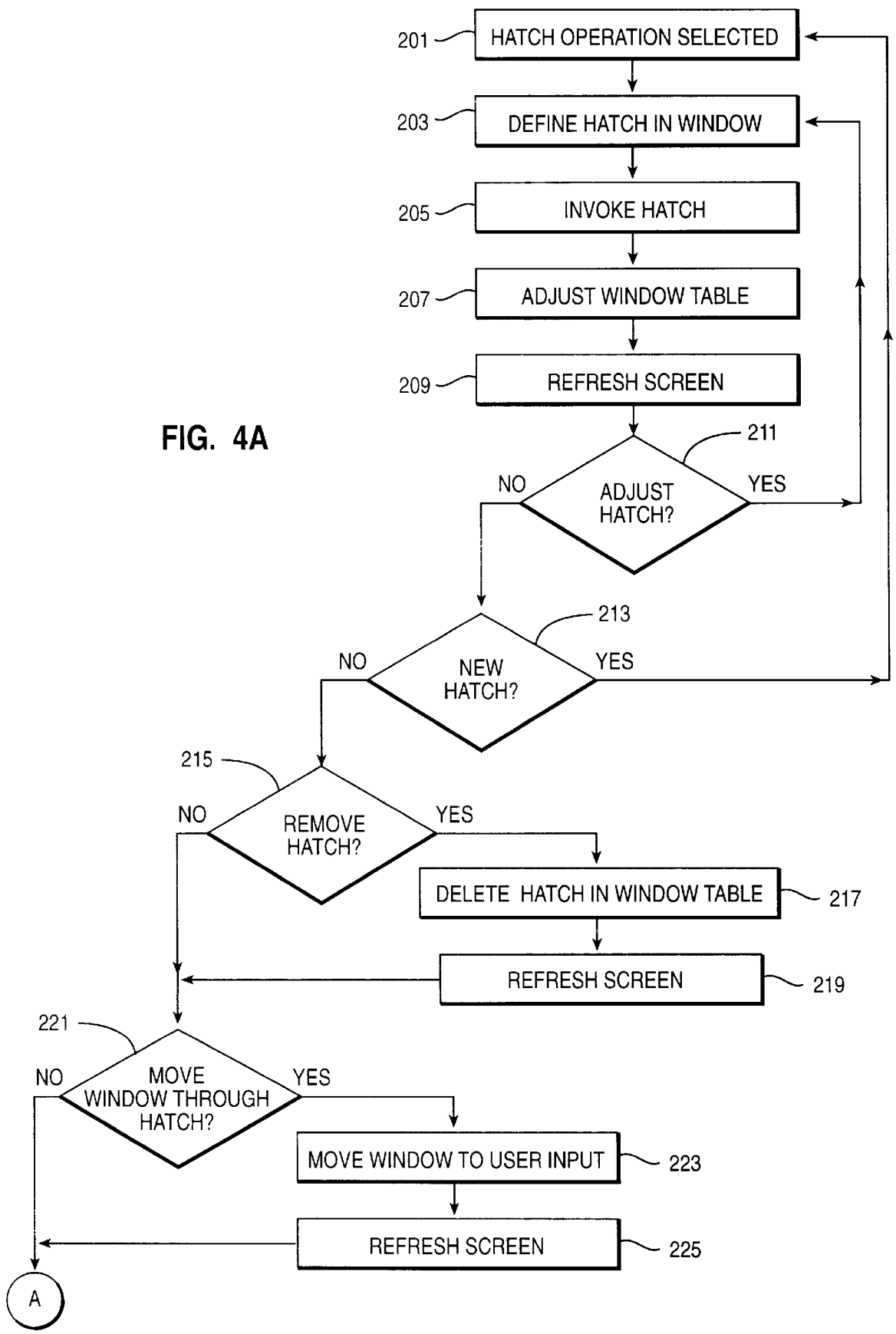

FIGS. 4A and 4B show the process for creating and adjusting a window hatch. In step 201, the window hatch operation is invoked by the user. Once the window hatch mode has been entered, the user then proceeds to define hatch in the window step 203. Once the user has defined the initial hatch dimensions, the hatch creation process is

TABLE 3

| STATE | PRIORITY | TYPE | x–y RANGE | PIXEL | PRIORIT | Hatch x–y | (REF) |
|---|---|---|---|---|---|---|---|
| Displayed | 1 | Desktop | 1/1:100/100 | X'FE',X'FE',X' . . . | 1;1;1 | | 100 |
| Iconified | 2 | game | 4/4:20/20 | X'1F',X'1F',X . . . | 2;2;2 | | 108 |
| Displayed | 5 | word processor | 15/30:75/80 | X'14',X'72',X' . . . | 5;5;5 | 30/40:40/50 priority 0; | 104/110 |
| Displayed | 3 | spread sheet | 40/3:97:40 | X'56',X'55',X' . . . | 3;3;3 | | 106 |
| Displayed | 6 | browser | 3/10:55/65 | X'00',X'00',X' . . . | 6;6;6 | 30/40;40/50 priority 0; | 102/110 |

As shown above Table 3 provides the window table data needed for the display of FIG. 2C, wherein collocated window hatches are defined in windows 102 and 104 to reveal a portion of window 106. Those skilled in the art will appreciate that many different window tables are possible depending on the windows and window hatches active in a particular session, but should understand how these tables would be constructed from the examples given.

Table 4 depicts an alternate embodiment of the Table of Windows. In this case, there are explicit entries for the hatch areas instead of hatch data associated with each window entry. When this technique is used, the hatch areas are given the highest priority so they overlay all lower priority pixels. The pixels to be used in the overlay are inherited from the area the hatch overlays. Collocated hatches are implemented by giving the deepest hatch area the highest priority. Although table space exists for Hatch x-y values for each window entry, this cell is null for each table entry, which permits the logic in FIG. 3 to function correctly without change.

invoked in step 205. Next, the hatch creation module adjusts the window table, step 207. Next, in step 209, the screen is refreshed, revealing the underlining window.

Next, in step 211, a test is performed to determine whether the user wishes to adjust the window hatch dimensions. For example, in the preferred embodiment, the user resizes the hatch by "grabbing" the borders of the hatch with the mouse pointer and dragging the hatch border like a conventional window resize. In alternative embodiments, there could be controls surfaced within a dialog box, such as a slider or spin button, to increase the size of the hatch incrementally.

Next, in step 213, a test determines whether a new hatch is to be created. If so, the process returns to step 201. If not, in step 215, a test determines whether the current window hatch is to be removed. This might occur when the user only wishes a brief glimpse at the underlining interface. If so, in step 217, the hatch is deleted in the window table.

In an alternative embodiment, the hatch may be saved in a list of defined hatches. Upon the selection of a user to see the list of active and inactive hatches, the list of hatches

TABLE 4

Alternate Embodiment of Window Table

| STATE | PRIORITY | TYPE | x–y RANGE | PIXEL | PRIORIT | Hatch x–y | (REF) |
|---|---|---|---|---|---|---|---|
| Displayed | 1 | Desktop | 1/1:100/100 | X'FE',X'FE',X' . . . | 1;1;1 | | 100 |
| Iconified | 2 | game | 4/4:20/20 | X'1F',X'1F',X . . . | 2;2;2 | | 108 |
| Displayed | 5 | word processor | 15/30:75/80 | X'14',X'72',X' . . . | 5;5;5 | | 104/110 |
| Displayed | 3 | spread sheet | 40/3:97:40 | X'56',X'55',X' . . . | 3;3;3 | | 106 |
| Displayed | 6 | browser | 3/10:55/65 | X'00',X'00',X' . . . | 6;6;6 | | 102/110 |
| Displayed | 7 | Hatch for browser | 30/40:40/50 | X'14',X'72',X' . . . | 7;7;7 | | 110 |
| Displayed | 8 | Hatch for word processor | 30/40:40/50 | X'56',X'55',X' . . . | 8;8;8 | | 110 |

Thus, in this more complex embodiment, each hatch is treated as a separate window entry in the window table. The value of the pixels would be derived from the window or windows which the hatch overlays, but the pixel priority would be derived from the window which contains the hatch. Although this technique is more complex in terms of could be presented to the user. An inactive or deleted hatch could then be selected to reactivate the hatch and reveal the underlining window anew. As will be seen, windows hatches which are collocated can be coupled together; it would be beneficial to list coupled hatches as a single entry in the hatch list. The hatch list could also be presented to the user as a set of hatch icons, one for each entry in the list. The window hatch list would be a desirable feature where the adjustment of a window hatch was particularly difficult.

Referring back to the figure, in step 219, the screen is refreshed. The original portion of the window wherein the window hatch was defined is again made visible in the interface.

In step 221, a test is performed to determine whether the user wishes to move the underlying window through the hatch. While the user may be able to reposition an underlying window by grabbing visible window borders, it may be more convenient to be able to scrolling the window through the window hatch. The underlying window can be scrolled through the hatch until the desired information is visible. While scrolling the underlying window, the mouse pointer might turn into a scroll/point icon. The user grabs a visible portion of the underlining window through the hatch and drags it with the scroll/point icon, step 223. As the user moves the underlying window the screen is refreshed 225. In this scrolling mode, once the scroll/point icon reaches the hatch border, scrolling continues until the scroll/point icon is released from the hatch border. Once finally positioned, the screen refreshes and the pointer icon reverts to normal.

The user may also adjust the details revealed by a hatch by a zoom or unzoom function on the underlying window, tested for in step 227. The zoom or unzoom function adjusts the font or feature size of the underlying window, step 229, so that the desired information would be visible through the hatch. For example, the font in the underlying window might be reduced in size so that more information is visible through the hatch. In step 231, the screen is refreshed. The test in step 233 determines whether the user is finished adjusting the window hatch. If so, the process ends, step 235. If not, in step 237, the process returns to step 211.

Figure 5A:
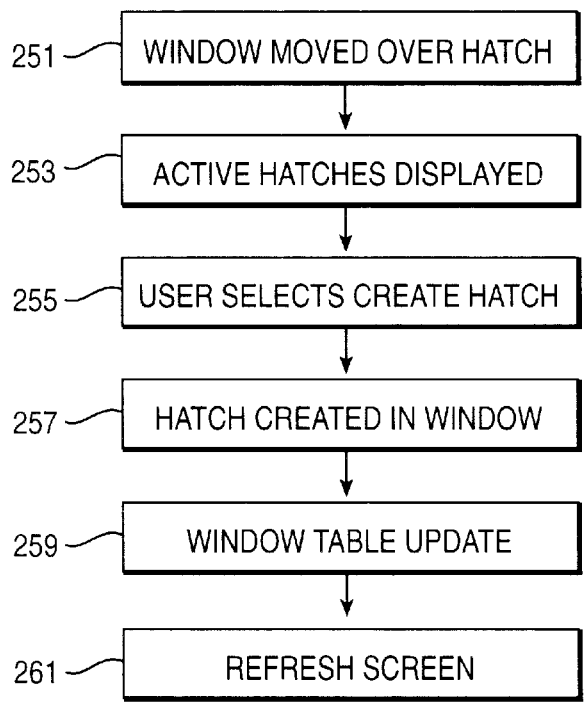
FIG. 5A shows one method of uncovering a preexisting window hatch when a new window is moved over the hatch.

One of the problems which could be encountered in this interface is where a new window is moved over a created hatch. FIG. 5A addresses this problem. In step 251, the new window is moved over an existing hatch. The user refers to a window hatch list having the status of the existing hatches, e.g., active, removed or covered. By reviewing the covered hatches in the list, the user can select the newly covered hatch. He is presented with the option of uncovering the selected hatch which opens a new collocated hatch through the overlying window. In step 255, the user selects the create hatch option. In step 257, hatch is created in the overlying window using the window coordinates for the hatch in the window table for the underline windows. The new hatch and the selected hatch are preferably coupled by this action. In step 259, the window table is updated and in step 261 the screen is refreshed.

The user could have certainly created a window hatch in the overlying window as described above in connection with FIGS. 4A and 4B. However, the precise position of the preexisting window hatch would be difficult to match. It is likely that multiple adjustments of the new hatch would be required.

Figure 5B:
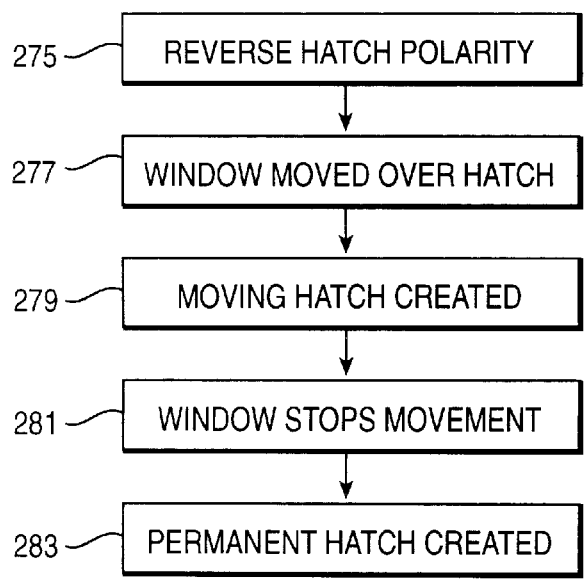
FIG. 5B shows an alternative method to assure that created window hatches remain visible in the interface.

Another solution to the problem of a new window covering an existing window hatch is shown in FIG. 5B. In step 275, the "polarity" of the window hatch is reversed. In reverse polarity, the portion of the underlying window which has been revealed by the hatch now takes priority over any other window. In step 277, when a new window is moved over the existing window hatch, a moving hatch is created in step 279. The moving hatch is present in the new window as it is moved over the existing window hatch. In this way, the underlying portion revealed by the window hatch is continuously visible. When the window stops movement, in step 281, a permanent hatch is created in step 283.

A third embodiment for dealing with the problem of new windows being moved over existing hatches is the automatic creation of a new window hatch in the new window. Once the system detects that new window overlies a window hatch and has stopped moving for a predetermined amount of time, the new hatch is created using the coordinates of the existing hatch. Like the reverse priority method, the user should preferably designate window hatches over which automatic creation of new hatches is desired. Otherwise, undesired window, hatches may be created.

In the preferred embodiment, when a window hatch is created in a window the window hatch is moved with the window when the window itself is moved. However, there are some circumstances when the default behavior is not desired, i.e. when the underlying material must still be visible yet the top window must be moved. In the case of multiple collocated hatches, it is possible to decouple the hatches, move the top window, refer to the window hatch list and uncover the hatch in a lower window. This is similar to the process depicted in FIG. 5A.

Figure 6:
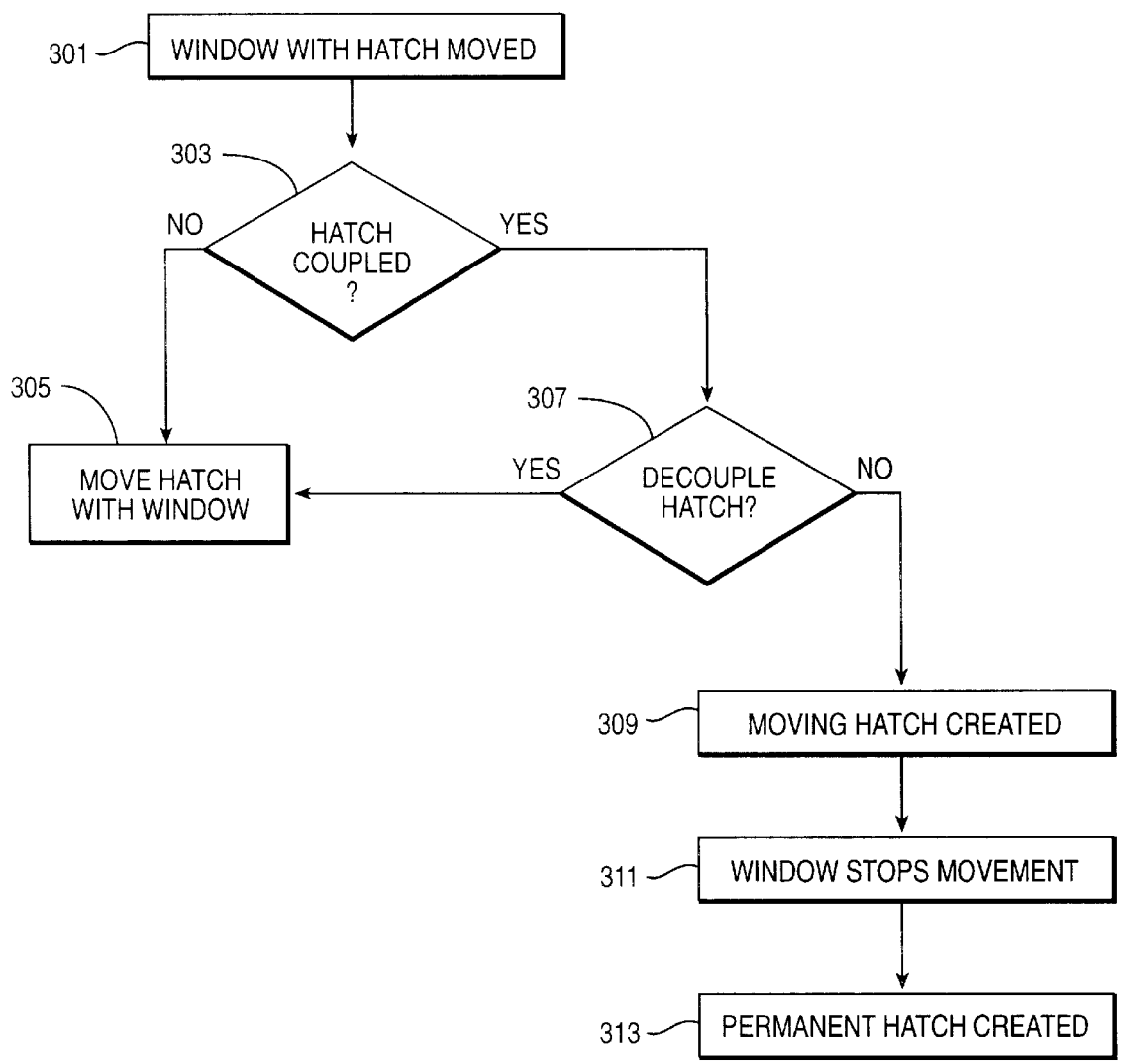
FIG. 6 depicts moving a window with a defined window hatch.

Another process is depicted in FIG. 6 wherein a window with a window hatch is moved. In step 301, the operating system detects that the window which is being moved is a window with a window hatch. The test in step 303 determines whether the hatch is "coupled" to other hatches. The hatch may be coupled because the hatch was created from an underlying hatch as depicted in FIG. 5A, its polarity has been reversed as shown in FIG. 5B or because several hatches are collocated as shown in the drill down sequence in FIGS. 2A–2D. If the hatch is not coupled, in step 305, the hatch is moved with the window and the pixels bounded by the hatch will change as the window is moved over different parts of the interface. If the hatch is coupled, in step 307, a test is made to determine whether the hatch should be decoupled. A dialog box could be presented to the user about the window hatch. "Do you want the window hatch to show the current display?", step 309. If the user elects to decouple the hatch, i.e. show the current display, step 311, it moves with the window in which it is defined, step 313. If the hatch is not decoupled, although the window hatch moves with the window, the pixels revealed by the hatch do not change. This is most easily accomplished where the hatch window is separately defined in the window table. As the window is moved, a new window location is determined, step 315. This new window location is used not only to update the position of the moving window in the window table, step 317 but also the window entry for the window hatch in the window table, step 319. Updates to the underlying window are made visible through the hatch, although the portion of the underlying window made visible through the hatch has been translated through movement of the top window.

In an alternative embodiment, a moving hatch is created, similar to the reverse polarity embodiment described with reference to FIG. 5B, so that the material revealed by the hatch continues to be revealed by the moving window. Once the operating system detects that window has stopped its movement, providing that the hatch is still within the window, a permanent hatch is created at the new location. It is possible that a permanent hatch at the edge of the moved window will be reduced in size.

The reader will appreciate that it is not always easy to create a window hatch at precisely the correct location of precisely the correct size and shape. This is why many methods of resize, adjustment and repositioning are included above.

Thus, a temporary display mode for the duration of the window hatch creation can be employed wherein details of the underlying portions of interface are surfaced for the purpose of creating the window hatch correctly. In this mode, all windows are made translucent, preferably indexed by color, so that features normally hidden by overlying windows are made visible. While this mode is too confusing to do much work, it is useful for the limited purpose of placing the window hatches.

Figure 7:
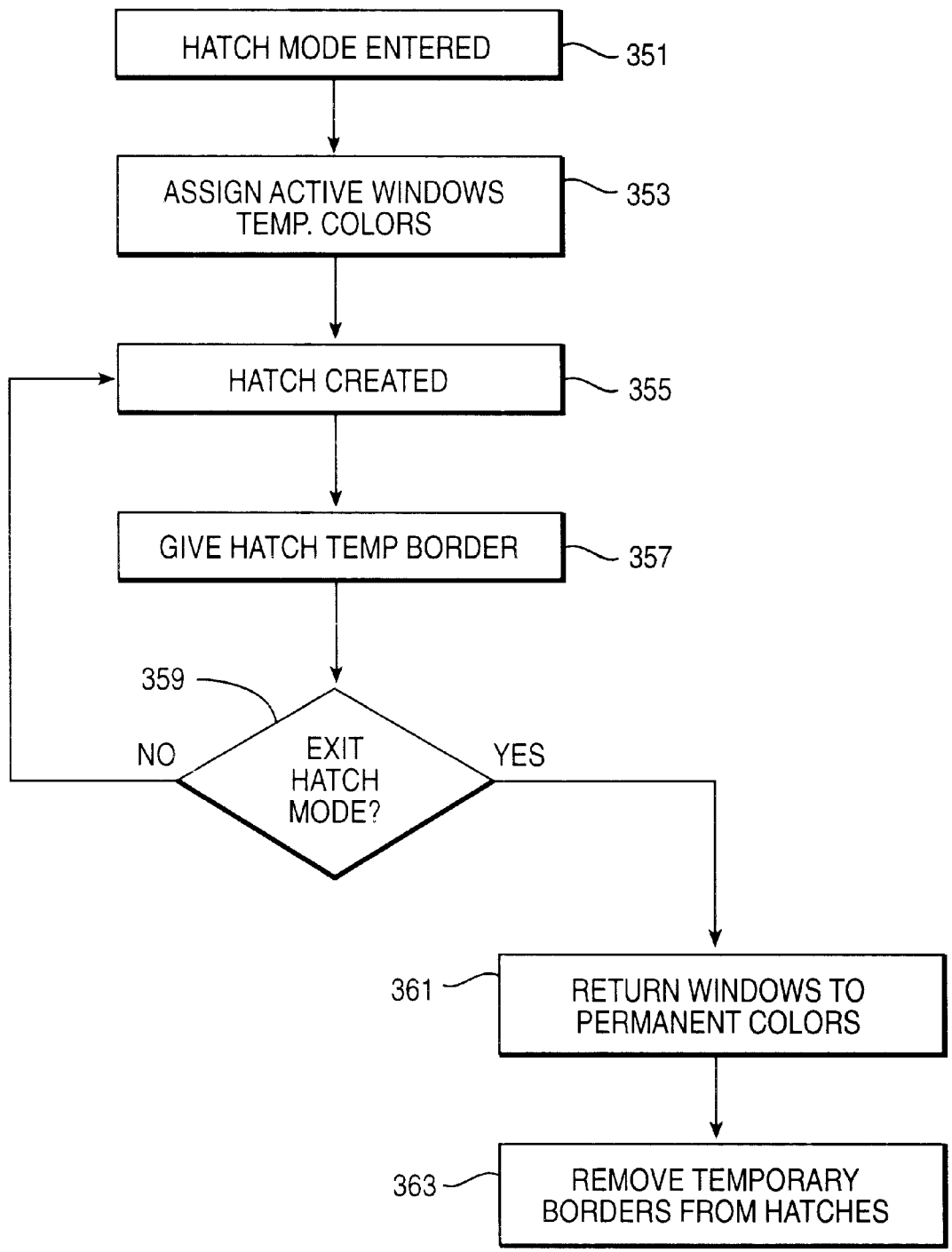
FIG. 7 is a flow diagram of an alternative embodiment wherein the hatch creation mode assigns temporary colors to windows in the interface to provide a means of understanding the relationship of various windows in priority.

FIG. 7 shows one embodiment of the temporary display mode wherein the windows are made translucent and the relative priority of windows within the interface is displayed to the user through the use of color. In step 351, the hatch creation mode is entered. Once this is entered, the active windows are assigned temporary colors in step 353, temporarily replacing the color assignments made by the application programmer. Referring back to the example depicted in FIGS. 2A–2E, windows 102, 104 and 106 might take on a red, blue and green color respectively. Alternatively, the windows of lowest priority might be assigned to the "coolest" colors of the spectrum whereas those of the highest priority would be assigned to the "hottest" colors of the spectrum, e.g., window 102 is red, window 104 is green and window 106 is purple. Depending on the number of windows active, different colors could be assigned. The point is to choose colors which will make it easy for the user to understand which features belong to which window in and which window the mouse pointer is currently located. Features within the window would be assigned darker or intensified versions of the colors assigned to the window as a whole.

In step 355, the window hatch is created in the in focus window. At the point, the hatch is given a temporary border, step 357, taking on a darker hue of the window in which the hatch is created. For example, a hatch through window 102 might take on a dark red hue. In step 359, a test determines whether the hatch mode is concluded. If not, the process continues to give hatches temporary borders indicative of the windows in which they are defined. For example, a second hatch created under hatch 110 in FIG. 2B would take on a dark green border so that the dark red and dark green colors indicate that two hatches exist. When the pointer icon is in a window, the window's pixels are preferably emphasized in some manner to indicate the window receiving input.

Since the windows in this mode are somewhat translucent, the portions of the windows which overlap are blended colors. For example, those areas of which a red and a blue window overlap could be displayed in a purple hue. The elements within a window such as text or graphics could be similarly blended. This is accomplished by logically combining the bytes which represents the pixels for overlapped windows and blending colors according to the rules for a light spectrum or pigment rules. If the windows are moved during hatch creation mode, the overlapped regions will change. The colors of the overlapped regions will change as well. For example, if a red window is moved from a brown overlapped region, indicating the presence of red, blue and yellow windows, the overlapped region will turn to green.

When the hatch creation mode is concluded in step 361, the windows are returned to their permanent colors and the temporary borders are removed from the hatches in step 363. A residual, double border might be left at the edges of two collocated hatches. The double border could be uncolored, but could be darker versions of the backgrounds of the windows in which the hatches are created.

In some embodiments, color blending or combining could be done on a solely numerical basis rather than on a "meaningful" color value basis. A solely numerical basis might better accommodate implementations which employ special hardware for performance considerations. In a numerical environment, alternative window blending would all be variations on logically combining the bytes which represent the pixels for overlapped windows; ANDing would produce a sparse or numerically low byte value; ORing would produce dense or numerically high byte values; and XORing (Exclusive ORing) would produce reversed or transposed byte values. The resultant byte value would be used as either the actual pixel color value or as in index into a table of pixel color values.

In window hatch creation mode, temporary colors can be assigned to windows without also making the windows translucent. This mode can help the user understand which window is made visible through the window hatch(es) by also looking at other visual cues such as window borders.

Certain displays such as those in a class of hand held computers known as personal data assistants as well as inexpensive laptops have a monochrome display. In this case, the windows in the window hatch creation mode may be displayed according to temporary values of gray along a gray scale, rather than according to temporary colors. Alternatively, they may be displayed according to degrees of opacity. These embodiments are less preferred than the translucent color embodiment.

While converting of the overlapping windows according to the color rules and translucency rules described above is useful for the creation of window hatches, it is also useful for a number of navigation tasks within the windowing interface. For example, a user may wish to bring a particular window to the top of the interface, but does not recall the name of the window. The translucent state can allow navigation to the desired window without disturbing the relative priority of the overlapping windows. Those skilled in the art will appreciate that other navigation and window tasks can also be improved by the use of this invention.

Other navigational aids can be presented to the user during window hatch creation mode. Instead of color, or in addition to, temporary numbers can be assigned to each overlapping window. These temporary numbers together with a window title can be presented to the user in a popup window list. As the user traverses the window hierarchy in window hatch creation mode, he would be shown which numbered window the pointer icon was currently located. This could be accomplished in several ways. The title of the window in the window list could be highlighted, in this case, assigning the temporary numbers is not strictly necessary. The number of the window could be displayed by changing the pointer icon to incorporate the temporary number in some way, e.g., changing the icon shape or, attaching bubble help with the temporary number. A special window or portion of the window list window can display the window.

A repeating watermark can be incorporated in background of each numbered window. The subtle pattern of the watermark should not obscure features of the window yet clearly show the user which window is currently displayed through the window hatch. This may be preferable to changing the shape of the mouse pointer in an unanticipated manner. Furthermore, watermarking can be used to display the window title in the background of each window rather than a temporary number. A window title watermark has the advantage of not requiring the user to learn the notion of temporary numbering during window hatch creation. It has the disadvantage in that many window names are long or not distinctive; the user may not be creating a window hatch which is large enough to display enough of the window title watermark to understand which window is visible through the window hatch. A number watermark is much shorter and relatively easy to surface in even a small window hatch. Those skilled in the art will appreciate that various combination of these navigation cues can be used in a particular implementation of the invention.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

I claim:

1. A method for creating window hatches in a windowing interface on a computer display, comprising the steps of:

entering a window hatch creation mode;

responsive to user definition of an area in an overlying window, identifying the user defined area within the overlying window in the interface as a window hatch;

changing a display mode of the window hatch within the overlying window and a number of intervening window, thus creating a corresponding number of window hatches with a shared border so that a portion of an underlying window is displayed through the window hatch; and simultaneously adjusting the window hatches responsive to manipulation of the shared border.

2. The method as recited in claim 1 further comprising the steps of:

prompting the user for a number of window hatches to be created at the coordinates of the user defined area within a corresponding number of windows; and responsive to user entry of a number of window hatches to be created, creating the entered number of window hatches through a corresponding number of windows at the user defined area.

3. The method as recited in claim 2 wherein the simultaneous adjustment of the window hatches is responsive to manipulation of a shared border of the window hatches by a pointing device.

4. The method as recited in claim 1 further comprising the step of repositioning the underlying window so that a different portion of the underlying window is displayed through the window hatch.

5. The method as recited in claim 1 further comprising the step of adjusting borders of the window hatch thereby changing dimensions of the window hatch.

6. The method as recited in claim 1 wherein the user defines the window hatch by clicking a button at least two different locations of a pointer icon in the overlying window.

7. The method as recited in claim 6 wherein the adjustment of the window hatch is responsive to manipulation of the border by a pointing device.

8. The method as recited in claim 1 further comprising the step of changing a magnification size of the underlying window to change the displayed portion of the underlying window through the window hatch.

9. The method as recited in claim 1 further comprising the steps of:

responsive to entry into the window hatch creation mode, assigning different colors to a plurality of overlapping windows in the interface; and redisplaying the overlapping windows according to the assigned colors.

10. The method as recited in claim 9 further comprising the steps of:

displaying the overlapping windows in a translucent state; and displaying overlapping portions of the overlapping windows according to color blend rules for the assigned colors of the overlapping windows.

11. A system for creating window hatches in a windowing interface, including processor, memory, input devices and a display, comprising:

means responsive to user input within an overlying window for identifying a user defined area within the overlying window in the interface;

means for creating a number of window hatches at the user defined area in the overlying window and a number of intervening windows, the window hatches having a shared border;

means for changing a display mode of the window hatch within the overlying window so that a portion of an underlying window is displayed through the window hatch; and means for simultaneously adjusting the window hatches responsive to manipulation of the shared border.

12. The system as recited in claim 11 further comprising means responsive to user input for creating a number of window hatches through a corresponding number of windows at the user defined area.

13. The system as recited in claim 11 further comprising means for repositioning the underlying window so that a different portion of the underlying window is displayed through the window hatch.

14. The system as recited in claim 11 further comprising means for adjusting borders of the window hatch thereby changing dimensions of the window hatch.

15. The system as recited in claim 11 wherein the user defined area is a rectangle having opposing corners selected by movement of a pointer icon in the overlying window.

16. The system as recited in claim 11 further comprising means for changing a magnification size of the underlying window to change the displayed portion of the underlying window through the window hatch.

17. The system as recited in claim 11 further comprising:

means for assigning different colors in a window hatch creation mode to a plurality of overlapping windows in the interface; and means for redisplaying the overlapping windows according to the assigned colors.

18. The system as recited in claim 17 further comprising:

means for selectively displaying the overlapping windows in a translucent state; and means for displaying overlapping portions of the overlapping windows according to color blend rules for the assigned colors of the overlapping windows.

19. The system as recited in claim 11 further comprising means for moving the window in which the window hatch is defined so that the portion of the windowing interface displayed through the window hatch changes with the movement of the window.

20. The system as recited in claim 11 further comprising:

means for fixing the position of the window hatch in the windowing interface; and means for moving the overlying window in which the window hatch is defined so that the portion of the windowing interface displayed through the window hatch remains constant as the window hatch position within the moving overlying window in which the window hatch is defined changes with movement of the window.

21. The system as recited in claim 11 further comprising:

means for fixing the portion of the windowing interface displayed through the window hatch; and means for moving the overlying window in which the window hatch is defined so that the portion of the windowing interface displayed through the window hatch remains constant as the window hatch position within the moving overlying window also remains constant.

22. A computer program product in a computer readable medium for creating window hatches in a windowing interface comprising:

means responsive to user input within an overlying window for identifying a user defined area within the overlying window in the interface;

means for creating a number of window hatches at the user defined area in the overlying window and a number of intervening windows, the window hatches having a shared border;

means for changing a display mode of the window hatch within the overlying window so that a portion of an underlying window is displayed through the window hatch; and means for simultaneously adjusting the window hatches responsive to manipulation of the shared border.

23. The product as recited in claim 22 further comprising means responsive to user input for creating a number of window hatches through a corresponding number of windows at the user defined area.

24. The product as recited in claim 22 further comprising means for repositioning the underlying window so that a different portion of the underlying window is displayed through the window hatch.

25. The product as recited in claim 22 further comprising means for adjusting borders of the window hatch thereby changing dimensions of the the window hatch.

26. The product as recited in claim 22 further comprising means for changing a magnification size of the underlying window to change the displayed portion of the underlying window through the window hatch.

27. The system as recited in claim 22 further comprising:

means for assigning temporary navigation cues to a plurality of overlapping windows in the interface; and means for displaying at least one temporary navigation cue.

* * * * *